United States Patent [19]

Raber

[11] Patent Number: 4,940,433
[45] Date of Patent: Jul. 10, 1990

[54] PROTECTIVE CONTROL SYSTEM FOR WATERCRAFT

[76] Inventor: David M. Raber, 11029 Tenacious Dr., Indianapolis, Ind. 46236

[21] Appl. No.: 358,593

[22] Filed: May 30, 1989

Related U.S. Application Data

[63] Continuation-in-part of Ser. No. 189,953, May 3, 1988, abandoned.

[51] Int. Cl.⁵ .............................................. B63H 21/22
[52] U.S. Cl. ......................................... 440/1; 114/273; 200/61.44
[58] Field of Search ............... 440/1, 84, 85, 86, 87, 440/113; 114/272, 273, 275; 200/61.24, 61.42, 61.44

[56] References Cited

U.S. PATENT DOCUMENTS

| | | | |
|---|---|---|---|
| 2,332,697 | 10/1943 | Claytor | 440/1 |
| 3,768,429 | 10/1973 | Greer | 114/274 |
| 3,865,063 | 2/1975 | Norton | 440/87 |
| 3,884,172 | 5/1975 | Takahashi | 114/273 |
| 3,903,832 | 9/1975 | Ishida | 114/273 |
| 3,918,382 | 11/1975 | Austin | 114/67 A |
| 4,048,939 | 9/1977 | Jones, Jr. | 114/125 |
| 4,095,549 | 6/1978 | Williams | 114/183 |
| 4,100,877 | 7/1978 | Scott et al. | 114/275 |
| 4,159,690 | 7/1979 | Farris | 114/275 |
| 4,237,811 | 12/1980 | Montez | 114/273 |
| 4,627,376 | 12/1986 | Scarfo et al. | 114/272 |
| 4,708,669 | 11/1987 | Kanno et al. | 440/1 |

*Primary Examiner*—Joseph F. Peters, Jr.
*Assistant Examiner*—Jesús D. Sotelo
*Attorney, Agent, or Firm*—Woodard, Emhardt, Naughton, Moriarty & McNett

[57] ABSTRACT

A control for a high performance watercraft that will automatically cut engine power and stabilize pitch attitude when the watercraft is airborne. This device maintains a manually trimmed pitch attitude when fully airborne. A gyroscope senses the boat's attitude and, when airborne, causes an airfoil or airfoils to correct a nose high or low attitude so that when the craft re-enters the water, it is at the proper, safe attitude. When back in the water, the engines return to the throttle position selected and the airfoil or airfoils return to the previously manually trimmed position. When in the water, the airfoil or airfoils can be manually trimmed so as to fine tune the craft for both water and wind conditions. It is this tuned position that the gyroscope seeks to attain while airborne.

10 Claims, 6 Drawing Sheets

PROTECTIVE CONTROL SYSTEM FOR WATERCRAFT

REFERENCE TO RELATED APPLICATION

This application is a continuation-in-part of U.S. Pat. application Ser. No. 189,953, filed on May 3, 1988 now abandoned.

BACKGROUND OF THE INVENTION

This invention relates to a protective control and stabilization system for high performance watercraft.

Certain types of high performance motor boats are driven at very high speeds on the order of sixty miles an hour or more frequently in relatively rough water such as found in the ocean. In such situations, the boat may leave the water and move a substantial distance through the air for a substantial period of time. The crew of the boat may include a person whose task it is to shut off the engine or engines of the boat when the propeller is out of the water in order to protect the engine and the power train from excessive rotational speed and from excessive strain from the propeller being re-submerged and abruptly slowed down while the propeller is rotating at an excessive rate.

In some cases, the high performance watercraft is provided with two or more engines and respective propellers for each engine. Also, particularly in the case of the inexperienced driver or crew, the take off is unexpected, resulting in no throttle reduction by the person charged with accomplishing the throttle reduction. Even the experienced driver and crew is unable to consistently prevent a temporary overrev condition, particularly when only one of the two propellers comes out of the water and the other remains submerged.

Another problem present in the operation of high speed watercraft is the control of the attitude of the watercraft as it leaves and enters the water. In presently available high speed watercraft, the driver does not have control of the boat once it leaves the water and does not regain control of the boat until it enters the water again. The attitude of the boat is normally determined by the manner in which the boat leaves the water. One problem experienced is called "stuffing" and refers to a condition wherein the nose of the boat comes into the water, causing the water to flow up over the boat into the cockpit, in many cases causing fatality.

Another problem is a "nose high" attitude when the boat enters the water. Such a condition causes the craft to land back on its transom and then to rock violently forward onto the nose, causing a stuffing accident or loss of control of the watercraft. It is desirable that means be provided for preventing and controlling such problems.

DESCRIPTION OF THE PRIOR ART:

Various prior art devices are concerned with protecting and controlling a watercraft as it moves in and out of the water because of high speed or for other reasons. The following patents disclose such devices:

| PATENT NO. | INVENTOR |
|---|---|
| 3,867,429 | Greer |
| 3,884,172 | Takahashi |
| 3,903,832 | Ishida |
| 3,918,382 | Austin |
| 4,048,939 | Jones, Jr. |
| 4,095,549 | Williams |
| 4,100,877 | Scott et al. |
| 4,159,690 | Farris |
| 4,237,811 | Montez |
| 4,627,376 | Scarfo et al. |
| 4,708,669 | Kanno et al. |

SUMMARY OF THE INVENTION

One embodiment of the present invention might involve a watercraft including an engine. There is provided propulsion means coupled to the engine and positioned to extend into the water when the watercraft is supported in the water. A switch is mounted on the watercraft and has an actuating arm movably mounted on the watercraft and positioned to be in the water when the propulsion means is in the water. The propulsion means is adapted to cause the watercraft to move through the water with the water moving over the actuating arm as it also moves over the propulsion means. There is further provided bias means acting on the switch to move it into an open circuit position but being overcome and moved to closed circuit position by water flowing over the switch and propulsion means. The switch controls the ignition of the engine and is opened to shut off the engine ignition by the bias means when the actuating arm is no longer held in closed circuit position by the water moving over the actuating arm.

One object of the present invention is to provide an improved watercraft.

Another object of the present invention is to provide a watercraft including means for protecting the engine and power train from being damaged by excessive rotational speed.

A further object of the present invention is to provide a watercraft including means for controlling the attitude of the craft when it leaves the water.

DESCRIPTION OF THE PREFERRED EMBODIMENT

Figure 2:
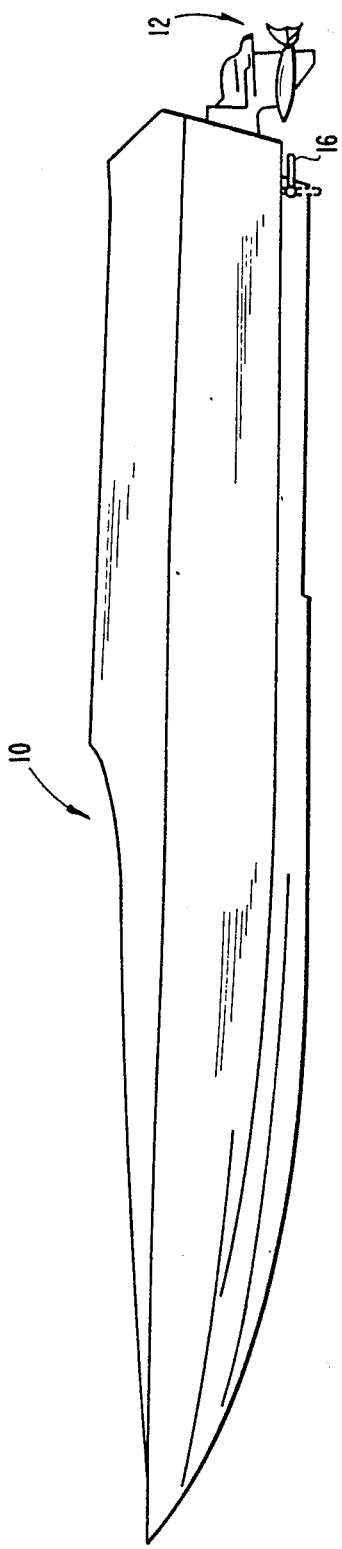
FIG. 2 is a side elevation of the watercraft of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
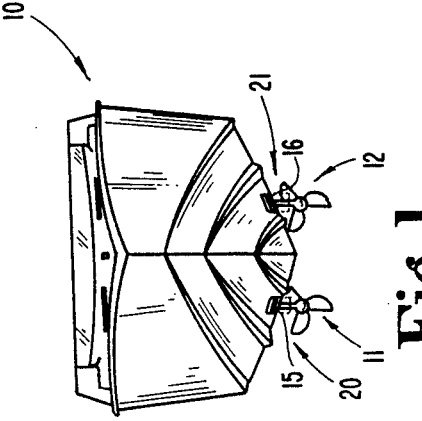
FIG. 1 is a front elevation of a watercraft incorporating the present invention.

Referring now to FIG. 1, there is illustrated a high speed watercraft 10 which is shown as having a deep V hull. One example of such a watercraft might be a Cougar craft with a 1200 horsepower rating and an overall length of 38 feet. Such a craft is manufactured by Cougar Holdings Limited of Cougar Quay, School Lane, Hamble, Hampshire SO3 5JD, England. Alternatively, the present invention may be used on a catamaran style hull or on other types of high speed hulls.

Figure 4:
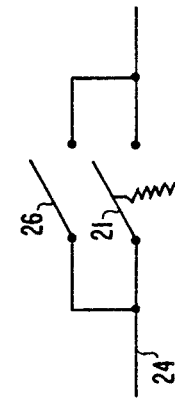
FIG. 4 is a schematic circuit diagram of the present invention.
Figure 3:
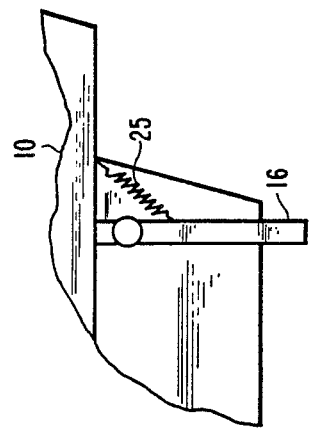
FIG. 3 is an enlarged view similar to FIG. 2 but with portions broken away showing the details of an actuating arm forming a part of the present invention.

The watercraft 10 has a pair of propulsion means 11 and 12 mounted thereon, each of which includes a propeller and each of which is driven by a separate engine through a separate power train. In the Cougar embodiment mentioned above, the engine means are twin Mercruiser V-8 engines. Positioned in front of each of the propulsion means 11 and 12 are the actuating arms 15 and 16 of a pair of electrical switches, only one of which 21 is shown in the schematic illustration of FIG. 4. In view of the fact that the switches 20 and 21 and the related circuit are essentially identical and operate identically, they will be described by the description and illustration of FIGS. 3 and 4 which shows the actuating arm 16 and the switch 21. A bias means such as a compression or tension spring 25 connected between watercraft 10 and arm 16 acts to maintain the switch actuating arm 16 in a position whereby the switch 21 is open, thus breaking the ignition circuit 24 to the engine which drives the propulsion means 12 propeller in front of which the actuating arm 16 is located. When the boat is in the water and the water is covering the propeller, at least partially so that the water is also covering the actuating arm 16, the movement of the boat through the water causes the water to overcome the bias produced by the spring 25 and causes the switch to move to the position illustrated in solid lines in FIG. 2 up against the hull and closing the switch 21. When the boat goes out of the water and causes the propeller to be exposed with the result that the engine overspeeds, the actuating arm 16 is also out of the water and is no longer held in the position of FIG. 2. The spring 25 then acts to move the actuating arm 16 to the position of FIGS. 3 and 4, opening the switch 21 and shutting off the ignition of the particular engine driving the propeller which is out of the water. When the boat again goes down into the water and is still moving, causing the actuating arm 16 to move to the position of FIG. 2, the ignition is again closed and engine power is restored.

The switch 21 may be bypassed by a manually operated switch 26 which is closed during starting and idling of the watercraft and is maintained closed until the watercraft is moving. Once the watercraft is moving, the switch 26 is opened, allowing the automatic operation of the actuating arm 16 to protect the engine and drive train driving the propulsion means 12.

Figure 5:
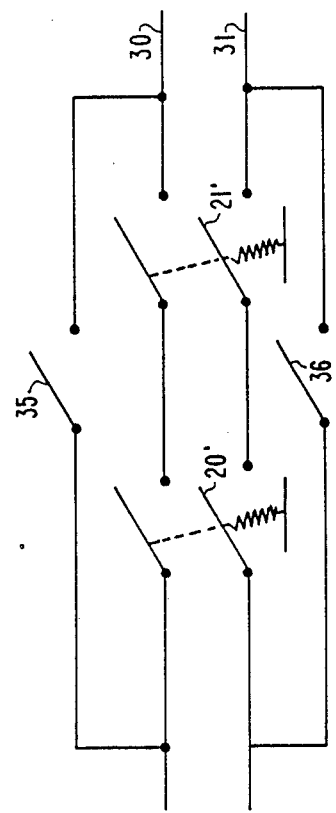
FIG. 5 is a schematic circuit diagram of an alternative embodiment of the present invention.

Referring to FIG. 5, an alternative version of the control system is illustrated. In the version of FIG. 5, the ignition circuit 30 represents one of the two engines and the ignition circuit 31 represents the other of the two engines. The switches 20' and 21' are controlled by actuating arms, one of which is located in front of one of the propellers and the other of which is located in front of the other propeller. Whenever either of the propellers goes out of the water, thus allowing the respective switch 20' or 21' to open, the ignition circuit 30 and 31 of both engines is shut off until that particular propulsion means with its protecting actuating switch 15 or 16 is again in the water and is moved to the position illustrated in FIG. 2 for the actuating arm 16. Each of the ignition circuits 30 and 31 has a manual bypass switch 35 and 36, respectively, which functions in the same fashion as the bypass switch 26 described above and illustrated in FIG. 4. The embodiment of FIG. 5 is intended for a pleasure craft as opposed to a racing craft. During racing it is desired that each propulsion means be driven by its engine so long as that propulsion means is in the water so as to maintain speed as high as possible. In the case of a pleasure craft, however, it is desirable that both engines be shut off when one is out of the water so as to make control of the craft easier.

Figure 6:
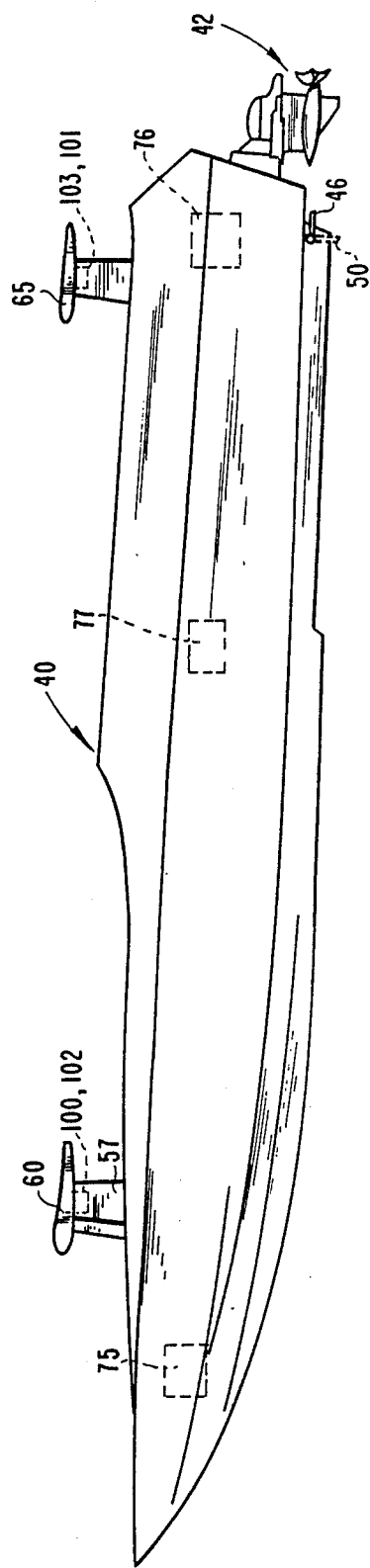
FIG. 6 is a side elevation of a watercraft forming an alternative embodiment of the present invention.

Referring now to FIG. 6 there is illustrated an alternative embodiment of the invention which includes a hull 40 having a pair of propulsion means 41 and 42 mounted thereon. Directly in front of each of the propulsion means 41 and 42 there is mounted a switch actuating arm 45 and 46, respectively, each of which is movable to the dotted line open switch position 50. Each of the arms 45 and 46 is biased similarly to the switches 20 and 21, the bias acting to normally hold the switch with the actuating arm extending to the dotted line position 50.

Mounted at the forward end of the hull 40, by vertical supports 55, 56, and 57, is airfoil 60. The airfoil 60 is pivoted about the axis 62. Mounted at the rear of the hull is a second airfoil 65 which is pivotal about the axis 67 and is vertically supported by the three supports 70, 71, and 72. Mounted on center supports 56 and 71 are airfoil actuators 102 and 103. Integral with airfoil actuators 102 and 103 are position transducers 100 and 101, respectively. Airfoil actuators 102 and 103 are connected to airfoils 60 and 65 and are the means by which the inclination or declination angles of airfoils 60 and 65 are adjusted.

At the bow of the craft 40 is a forward vertical accelerometer 75 which produces an electrical signal proportional to vertical acceleration. Mounted on the craft's transom is an aft vertical accelerometer 76 which produces an electrical signal proportional to the aft vertical acceleration of the boat. A vertical gyro 77 is mounted in the craft, preferably near the center of gravity, for producing signals proportional to the pitch angle of the craft with respect to vertical. The gyro 77 will produce an output signal proportional to the amount or degree of pitch, while the accelerometers will produce signals proportional to the rate of change of angular velocity about the pitch axis. The forward and aft airfoils 60 and 65 operate in opposite directions to correct any deviation from the desired pitch condition. For example, if the bow of the craft should dip, the forward airfoil will be rotated clockwise, while the aft airfoil will be rotated counterclockwise to produce a moment counter-balancing that pitching moment caused by waves or wind.

Figure 9:
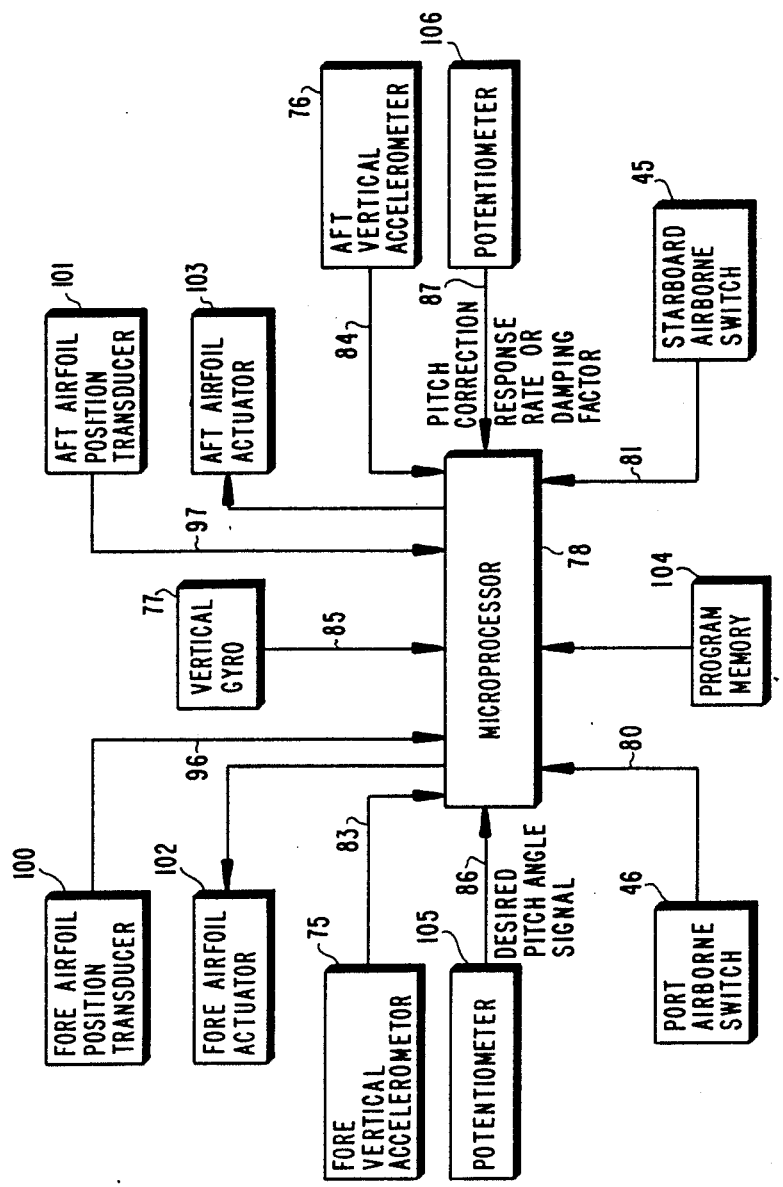
FIG. 9 is a schematic block diagram of the control circuit of the embodiment of FIGS. 6, 7 and 8.

The control system depicted in FIG. 9 counteracts angular movement about the pitch axis and constantly adjusts the airfoils 60 and 65 to maintain a desired pitch angle or trim of the craft 40 while the craft 40 is in the water or airborne. The forward and aft airfoils 60 and 65 will have a more pronounced effect in controlling the pitch angle of the boat once the boat is airborne. While in the water, the airfoils 60 and 65 will act to correct pitch angle, however the resistive force of the water beneath the craft 40 will diminish the corrective action produced by the airfoils 60 and 65.

Referring to FIG. 9, a block diagram of the protective control system is shown. A microprocessor based control system provides flexibility in adapting the system to a variety of crafts. Changeable memory device 104 allows for implementation of the protective control system on a variety of crafts. Length, width, and mass of the craft will impact the vertical forces necessary from the airfoils 60 and 65 to correct improper pitch angles of the craft 40 of FIG. 6, thus the ability to change programs expands the application scope of the protective control system.

Figure 7:
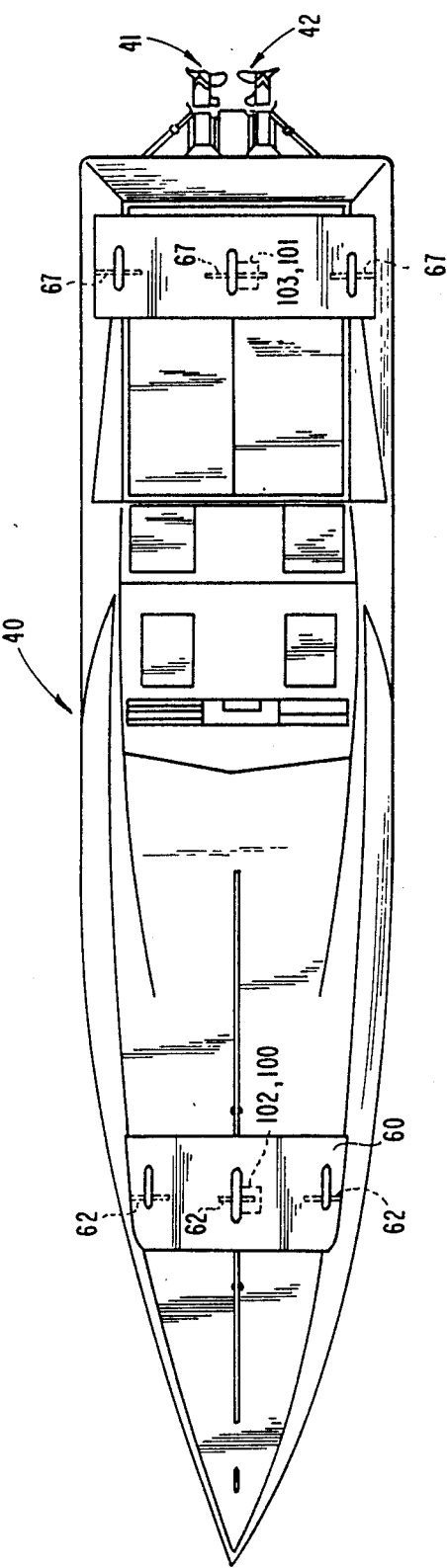
FIG. 7 is a top plan view of the watercraft of FIG. 6.

Vertical gyro 77 produces a signal 85 proportional to the actual pitch angle of the boat 40 of FIG. 7. Fore vertical accelerometer 75 and aft vertical accelerometer 76 produce acceleration signals 83 and 84 proportional to the forward and aft vertical acceleration of the craft 40 of FIG. 6. Signal 86 from potentiometer 105 indicates to the microprocessor 78 the desired pitch angle selected by the operator of the craft 40 of FIG. 6. Potentiometer 106 produces a signal 87 corresponding to the response rate with which the microprocessor 78 acts to correct the deviation between the desired Pitch angle signal 86 and the actual pitch angle signal 85. Port airborne switch 46 and starboard switch 45 produce signals indicating to the microprocessor the position of the craft regarding an airborne or in water position. These switches are actuated by the activating arms 45 and 46. This information is used by the microprocessor to undampen the response rate of the microprocessor in addition to the response rate or damping factor signal 87 when both of the activating arms are out of the water and move to the perpendicular position 50. It should be recognized that a body floating through the air is more easily moved by external forces than a body floating on top of water. Therefore, when the craft 40 of FIG. 6 is airborne, airfoils 60 and 65 of FIG. 6 produce vertical forces which move the fore and aft portion of the craft 40 more easily than if the boat were in the water. Airfoil 60 is controlled by fore airfoil actuator 102. The position of the fore airfoil actuator 102 is provided by fore airfoil position transducer 100 as signal 96. Air foil 65 is controlled by aft airfoil actuator 103. The position of airfoil 65 is indicated to the microprocessor by aft airfoil position transducer 101 which produces aft airfoil position signal 97 which is connected to microprocessor 78.

Microprocessor 78 is constantly and rapidly monitoring all input signals which include signals 80, 81, 83, 84, 85, 96, 97, 86 and 87. The microprocessor program objective is to move airfoils 60 and 65 so that the actual pitch angle 85 corresponds as close as possible to the desired pitch angle signal 86. By monitoring the fore vertical acceleration signal 83 and the aft vertical acceleration signal 84, microprocessor 78 can act to compensate the rate at which the angular velocity of the craft is varying with respect to the pitch axis by positioning airfoils 60 and 65 of FIG. 6. Additionally, the pitch correction response rate or damping factor signal 87 and signals 80 and 81 indicative of the in-water or airborne state of the craft will also affect the vertical forces necessary from the airfoils for pitch angle correction. The response rate signal 87 provides the microprocessor 78 with an indication of the force magnitude requested to counteract the angular moment imparted to the craft by waves in the water. A higher amplitude of signal 87 will cause the microprocessor 78 to move the airfoils more rapidly and to position the airfoils so that the forces produced by the air flowing across the airfoils is increased in relation to the relative amplitude of signal 87 to counteract the improper pitch position of the craft or the difference between the actual pitch angle signal 85 and the desired pitch angle signal 86. Where the water surface conditions are more calm, the operator will reduce the amplitude of signal 87 to increase the response time of the microprocessor 78 in correcting pitch angle, and thus decreasing the magnitude of the forces produced from the airfoils in correcting improper pitch.

Figure 8:
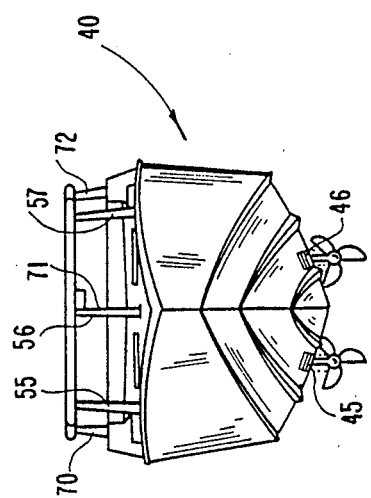
FIG. 8 is a front elevation of the watercraft of FIGS. 6 and 7.
Figure 10:
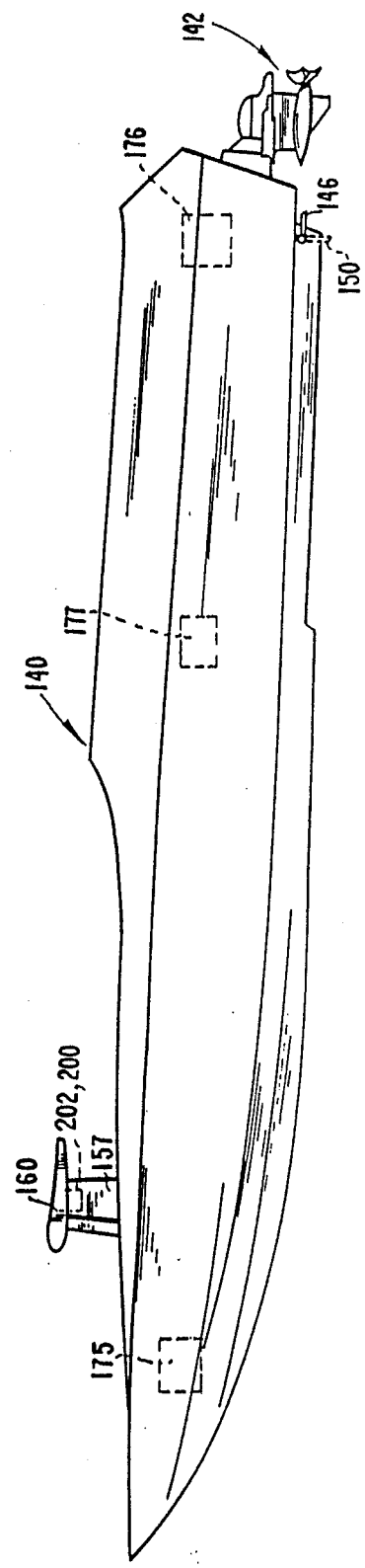
FIG. 10 is a side elevation of a watercraft forming a further alternative embodiment of the present invention.
Figure 11:
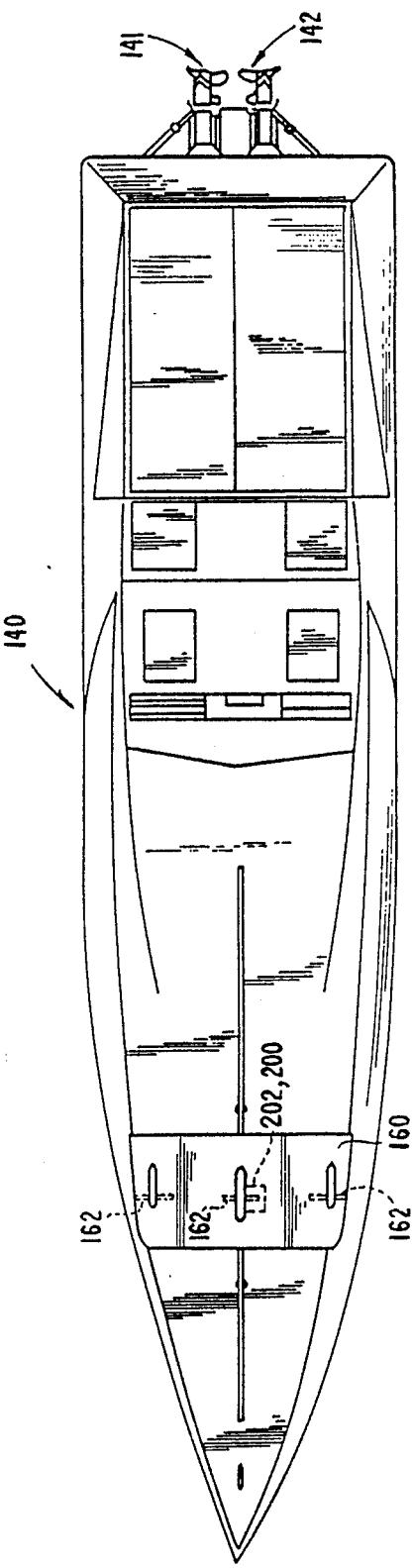
FIG. 11 is a top plan view of the watercraft of FIG. 10.
Figure 12:
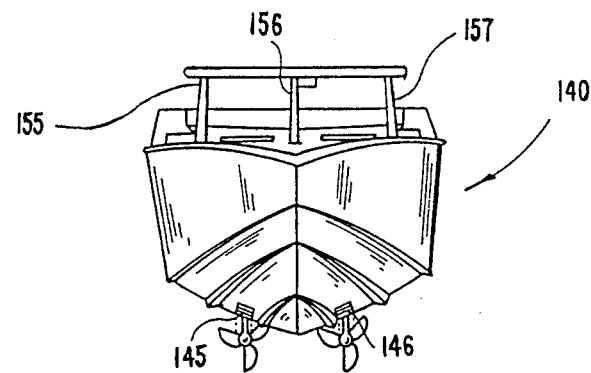
FIG. 12 is a front elevation of the watercraft of FIGS. 10 and 11.

Another embodiment of the invention which enhances the stability of the watercraft is illustrated in FIG. 10. This embodiment is identical to the embodiment of FIG. 6, with the exception that instead of utilizing two airfoils which operate in conjunction with each other to enhance the stability of the watercraft, the embodiment utilizes only a single airfoil which may be positioned at the bow of watercraft 140. This embodiment includes a hull 140 having a pair of propulsion means 141 and 142 mounted thereon. In front of each of the propulsion means 141 and 142 is positioned a switch actuating arm 145 and 146, respectively, each of which is movable to the dotted line open switch position 150. The actuating arms 145 and 146 are biased similarly to switches 45 and 46 of FIG. 8. The bias acts to normally hold the switch with the actuating arm extended to the dotted line position 150. An airfoil 160 is mounted at the forward end of hull 140 by vertical supports 155, 156 and 157. The airfoil 160 is pivoted about the axis 162. Mounted on center support 156 is airfoil actuator 202. Integral with airfoil actuator 202 is position transducer 200. Airfoil actuator 202 is connected to airfoil 160 and is the means by which the inclination or declination angle of airfoil 160 is adjusted.

A forward vertical accelerometer 175 is positioned at the bow of craft 140 and produces an electrical signal proportional to vertical acceleration. An aft vertical accelerometer 176 is mounted on the craft's transom and Produces an electrical signal proportional to the aft vertical acceleration of the boat. A vertical gyro 177 is mounted in the craft, and produces signals proportional to the pitch angle of the craft with respect to vertical and is preferably positioned near the center of the gravity of the craft. The gyro 177 functions to produce an output signal proportional to the amount or degree of pitch, while the accelerometers function to produce signals proportional to the rate of change of angular velocity about the pitch axis. The forward airfoil 160 operates to correct any deviation from the desired pitch condition. For example, if the bow of the craft should dip, the airfoil 160 will be rotated clockwise to produce a moment counterbalancing that pitching moment caused by waves or wind.

The control system of FIG. 9 integrally operates with the single airfoil embodiment of FIG. 10 in a substantially identical manner as it does with the multiple airfoil embodiment referred to in FIG. 6.

In accordance with the present invention, the possibility of unsafe attitudes caused by water and wind conditions amplified by an over-powered or under-powered take off condition is dramatically reduced. In the two airfoil embodiment, both forward and aft airfoils, and in the single airfoil embodiment, the single airfoil, will be automatically adjusted to compensate for any pitching movements and facilitate a more gentle contact with the surface of the water. As the craft's submerged switches close by coming in contact with the water, the engine's ignition system is re-activated in conjunction with the airfoil(s) returning to the last manually trimmed position. Both submerged switches must be open to initiate the stabilization airborne mode, whereas in the racing mode, each engine's ignition system is individually controlled by the submerged switch in front of that particular propeller. For a tri-engined boat, three switches would individually control their respective engines, but all three would have to be open, indicating a full airborne condition exists, thus activating airborne stabilization.

It can be seen that the present invention provides an improved watercraft including means for protecting the engine and power train from being harmed by the excessive rotational speed that can occur when the propeller of the engine leaves the water during racing and other such situations. It will also be evident that the present invention provides means for controlling the attitude of the craft when it leaves the water.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A watercraft comprising an engine, a propulsion means coupled to said engine and positioned to extend into the water when said watercraft is supported in the water, a switch mounted on said watercraft and having an actuating arm movably mounted on the watercraft and positioned to be in the water when said propulsion means is in the water, said propulsion means being adapted to cause the watercraft to move through the water with the water moving over the actuating arm as it also moves over the propulsion means, bias means acting on said switch to move it to an open circuit position but being overcome and moved to closed circuit position by water flowing over said actuating arm and propulsion means, said switch controlling the ignition of said engine and being opened to shut off said ignition when said actuating arm is no longer held in closed circuit position by said water moving over said actuating arm, said propulsion means including a propeller, said actuating arm being located in front of the propeller and in the path of the water as it moves into said propeller.

2. The watercraft of claim 1 additionally comprising a second engine and a second propulsion means coupled to said second engine and positioned to extend into the water when said watercraft is supported in the water, a second switch mounted on said watercraft and having a second actuating arm movably mounted on the watercraft and positioned to be in the water when the second propulsion means is in the water, a second bias means acting on said second switch to move it to an open circuit position but being overcome and moved to closed circuit position by water flowing over said second actuating arm and propulsion means, said second switch controlling the ignition of said second engine and being opened to shut off the ignition of said second engine by said second bias means when said second actuating arm is no longer held in closed circuit position by said water moving over said second actuating arm.

3. A watercraft comprising an engine, a propulsion means coupled to said engine and positioned to extend into the water when said watercraft is supported in the water, a switch mounted on said watercraft and having an actuating arm movably mounted on the watercraft and positioned to be in the water when said propulsion means is in the water, said propulsion means being adapted to cause the watercraft to move through the water with the water moving over the actuating arm as it also moves over the propulsion means, bias means acting on said switch to move it to an open circuit position but being overcome and moved to a closed circuit position by water flowing over said actuating arm and propulsion means, said switch controlling the ignition of said engine and being opened to shut off said ignition when said actuating arm s no longer held in closed circuit position by said water moving over said actuating arm, a second engine and a second propulsion means coupled to said second engine and positioned to extend into the water when said watercraft is supported in the water, a second switch mounted on said watercraft and having a second actuating arm movably mounted on the watercraft and positioned to be in the water when the second propulsion means is in the water, a second bias means acting on said second switch to move it to an open circuit position but being overcome and moved to closed circuit position by water flowing over said second switch actuating arm and second propulsion means, said second switch controlling the ignition of said second engine and being opened to shut off the ignition of said second engine by said second bias means when said second actuating arm is no longer held in closed circuit position by said water moving over said second actuating arm, and wherein opening of either switch shuts off the ignition of both engines.

4. A watercraft comprising an engine, a propulsion means coupled to said engine and positioned to extend into the water when said watercraft is supported in the water, a switch mounted on said watercraft and having an actuating arm movably mounted on the watercraft and positioned to be in the water when said propulsion means is in the water, said propulsion means being adapted to cause the watercraft to move through the water with the water moving over the actuating arm as it also moves over the propulsion means, bias means acting on said switch to move it to an open circuit position but being overcome and moved to closed circuit position by water flowing over said actuating arm and propulsion means, said switch controlling the ignition of said engine and being opened to shut off said ignition when said actuating arm is no longer held in closed circuit position by said water moving over said actuating arm, airfoil means mounted on the watercraft for controlling the attitude of the watercraft, said airfoil means being coupled to said switch so that said airfoil means is operated differently when said switch is in the water than it is when the switch is out of the water.

5. The watercraft of claim 4 additionally comprising gyroscope means coupled to said airfoil means for controlling the attitude of the watercraft.

6. The watercraft of claim 5 additionally comprising microprocessor means coupling said gyroscope means and said airfoil means, and means for manually setting the desired pitch angle of the craft coupled to said gyroscope means, switch and airfoil means.

7. A watercraft comprising an engine, a propulsion means coupled to said engine and positioned to extend into the water when said watercraft is supported in the water, a switch mounted on said watercraft and having an actuating arm movably mounted on the watercraft and positioned to be in the water when said propulsion means is in the water, said propulsion means being adapted to cause the watercraft to move through the water with the water moving over the actuating arm as it also moves over the propulsion means, bias means acting on said switch to move it to an open circuit position but being overcome and moved to closed circuit position by water flowing over said actuating arm and propulsion means, said switch controlling the ignition of said engine and being opened to shut off said ignition when said actuating arm is no longer held in closed circuit position by said water moving over said actuating arm, airfoil means mounted on the watercraft for controlling the position of the watercraft with relation to the water, said airfoil means being coupled to said switch so that said airfoil means is operated differently when said switch is in the water than it is when the switch is out of the water.

8. The watercraft of claim 7 wherein said airfoil means includes only a single airfoil.

9. The watercraft of claim 8 wherein said airfoil means is positioned at the bow of said watercraft.

10. The watercraft of claim 7 wherein said airfoil means includes a plurality of airfoils.

* * * * *